United States Patent Office 3,141,303
Patented July 21, 1964

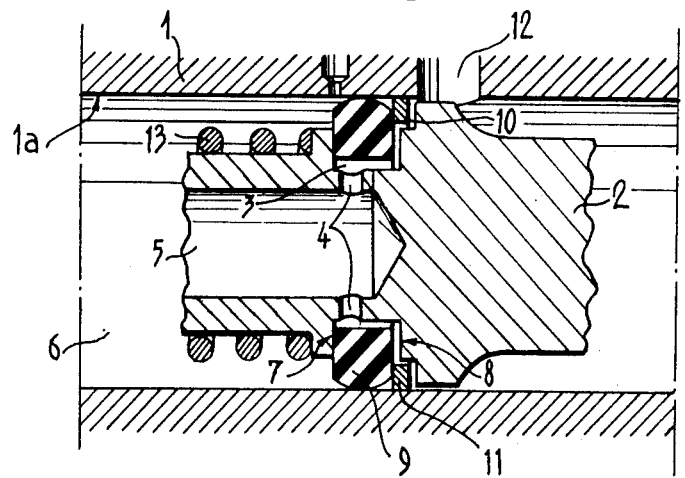
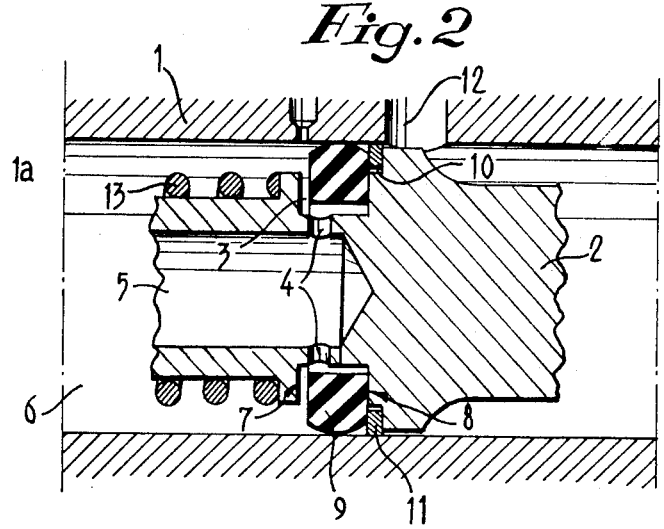

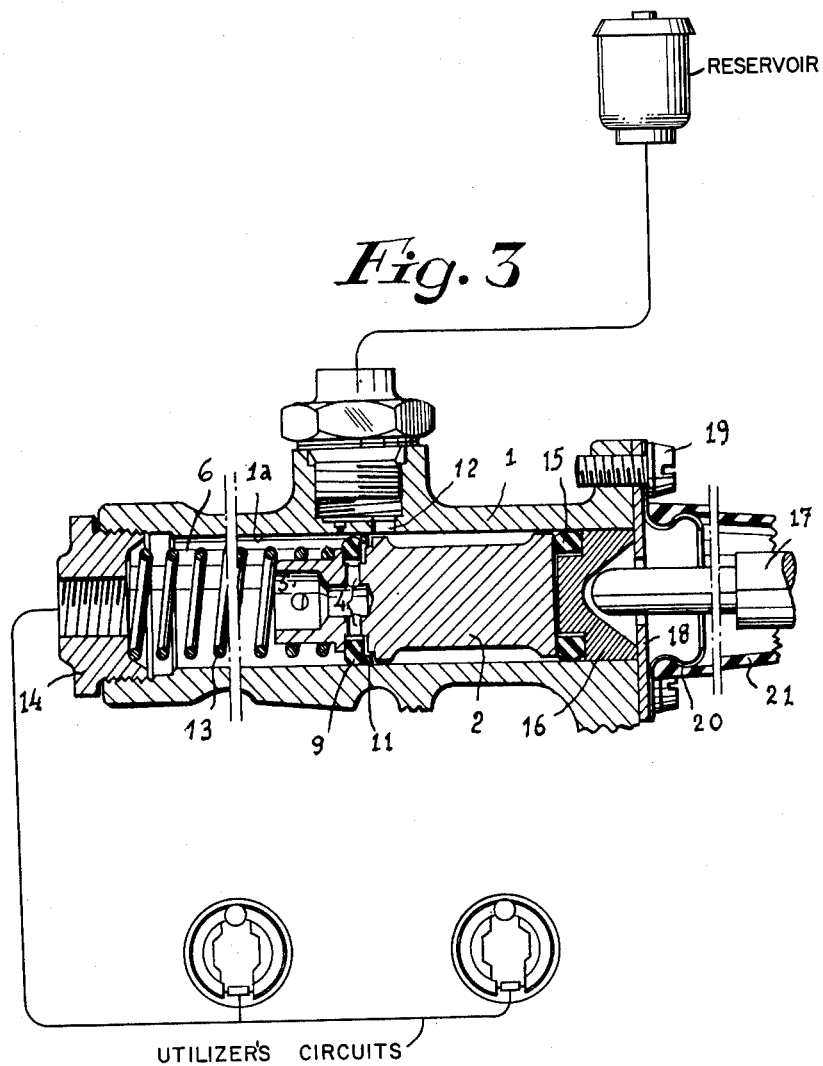

3,141,303
MASTER CYLINDERS FOR HYDRAULIC
TRANSMISSION SYSTEMS
Philip S. Baldwin, 15 Piazza S. Spirito, Florence, Italy, assignor of one-half to Fiat Societa per Azioni, Turin, Italy
Filed Jan. 9, 1962, Ser. No. 165,188
Claims priority, application Italy Jan. 11, 1961
2 Claims. (Cl. 60—54.6)

This invention relates to a pump for liquids, more particularly a master cylinder for hydraulic transmission systems provided on motor vehicles.

Pumps of this type are known which comprise a cylinder connected with the utilizing circuits and a reservoir containing a liquid, preferably oil.

A piston is movable in the cylinder and is actuated by a pedal through leverages and a push rod. The piston head carries a resilient packing sealing against the inner surface of the cylinder wall to prevent flow of liquid to the reservoir during the operative stroke of the piston.

Pumps of this type are provided with valves which intercept communication between the cylinder chamber connected to the utilizing circuits and the reservoir during the operative piston stroke and which re-establish such communication during the return stroke of the piston.

Pumps of the above specified type are known in which the packing sealing between the piston and the inner surface of the cylinder wall acts as the valve controlling the communication between the cylinder chamber connected to the reservoir and the utilizing circuits. In this case the packing is in form of a ring accommodated with an axial and radial clearance by a circumferential groove in the piston head. The bottom of the groove is connected through radial holes with a front opening in the piston head. The packing ring is of substantially rectangular cross sectional shape, the outer side of the rectangle being arcuated in order to reduce the contact surface of the packing seal and inner surface of the cylinder wall.

During the operative stroke of the piston the annular packing moves in the direction of the radial shoulder on the groove situated on the remote side of the cylinder chamber connected with the utilizing circuits, thereby cutting off the communication between the said chamber and the reservoir. During the return stroke of the piston the packing moves towards the opposite shoulder on the annular groove to thereby re-establish communication between the cylinder chamber connected with the utilizing circuits and the reservoir through the front opening and radial holes bored in the piston head.

In pumps of this type a small annular clearance only is left between the shoulder on the annular groove remote from the chamber connected with the utilizing circuits and the inner surface of the cylinder wall, said clearance being just sufficient to admit oil flow from the reservoir to the chamber connected with the utilizing circuits during the return stroke of the piston.

During the said operative stroke of the piston, when the liquid is delivered to the utilizing circuit and rises in pressure, the clearance is fully covered by the packing material which undergoes a certain deformation under the action of the rising liquid pressure in the pump. Deformation of the resilient seal at its region facing the clearance between the said shoulder and the inner surface of the cylinder wall is not objectionable as long as the pressures built up in the pump do not reach particularly high values. In fact, pumps of this type are employed as master cylinders on motor vehicles without giving rise to any drawbacks. However, for special uses requiring a very high pressure to be built up in the pump chamber connected with the utilizing circuits, deformation of the resilient packing acting as a valve may become excessive and the packing material will be extruded through the clearance between the shoulder on which the packing bears during the operative stroke of the piston and the inner surface of the cylinder wall. Obviously, this process leads to rapid destruction of the packing, the useful life of which is in this case rather short and at times inconsistent with the frequency of overhaul of the vehicle.

This invention obviates the above drawback by arranging beside the annular packing, on the side of the latter facing the abovementioned annular clearance a ring made of a material which is substantially undeformable under pressures acting in the pump, the said ring being slidably mounted in the cylinder substantially without any circumferential clearance with respect to the inner surface of the cylinder wall. According to a preferred embodiment of this invention the ring is rectangular in cross sectional shape, the periphery of the shoulder on which the packing bears during the operative piston stroke being formed with an annular step, the axial size of which substantially matches the thickness of the said undeformable ring, the radial depth of the annular step being such as to leave a radial clearance between its cylindrical surface and the inner ring surface.

The above structure and arrangement of components insure a correct operation of the packing as a valve and eliminate the risk of deterioration of the packing at its periphery, that is, at its region most subject to wear during the pump operation.

Further characteristic features and advantages of this invention will be clearly understood from the appended description referring by way of a non-limiting example to the accompanying drawings which show a preferred embodiment. On the drawings:

FIG. 1 is a longitudinal sectional view diagrammatically showing the arrangement of the main components of an improved pump during the piston return stroke, FIG. 2 is a longitudinal sectional view showing the arrangement of the same pump components during the operative piston stroke, FIG. 3 is a longitudinal sectional view of an improved pump employed as a master cylinder for hydraulic transmission systems provided on motor vehicles.

On the drawings in the diagrammatical representation according to FIGS. 1 and 2, 1 denotes the wall of a cylinder in which a piston 2 moves under the action of means not shown. The piston head is formed with an annular groove 3 connecting through radial holes 4 with a front bore 5 opening into the chamber 6 in the cylinder communicating with the utilizing circuits not shown. The annular groove 3 is defined on the side of the chamber 6 by a radial shoulder 7 the outer diameter of which is considerably smaller than the diameter of the inner surface 1a of the cylinder wall, and on its opposite side by a radial shoulder 8, the outer diameter of which is slightly smaller than that of the inner bore of the cylinder 1. The groove 3 accommodates an annular packing 9 made of resilient material of rectangular cross sectional shape, the outer side of the rectangle being in contact with the surface 1a being arcuated in order to reduce the contact area between the packing 9 and surface 1a. The inner bore of the annular packing 9 has a diameter which is substantially larger than the diameter of the bottom of the annular groove 3 and the packing 9 is of a smaller axial width than the width of the said groove 3.

An annular step 10 is formed at the periphery of the shoulder 8 and a rigid ring 11 is arranged at the step. The ring 11 is of rectangular cross sectional shape and is slidably mounted substantially without any radial clearance within the cylinder 1 and arranged adjacent the packing 9 on the side of the latter facing the shoulder 8. The ring 11 substantially matches in thickness the axial dimension of the step 10, its bore being somewhat smaller than the diameter of the cylindrical step section. This structure and arrangement of the parts affords free communication of the chamber 6 connected with the utilizing circuits and opening 12 in the wall of the cylinder 1 connecting with a reservoir, not shown, during the return stroke accomplished by the piston 2 under the action of spring 13, FIG. 1, and cut off the said communication during the stroke accomplished by a piston 2 against the action of spring 13, FIG. 2.

In the embodiment shown in FIG. 3 the pump is in the form of a master cylinder for hydraulic brake mechanisms or for operating the friction clutch or the like on motor vehicles. It will be seen that the cylinder 1 is closed at the front by a plug 14 formed with a tapped through opening which is connected by conduits, not shown, with the hydraulic motors acting upon the brake jaws or upon the clutch of the vehicle.

The piston 2 carries a rear seal 15 acted upon by the push rod 16 in which a seat is formed for the rod 17 actuated by the brake pedal not shown.

The cylinder is closed at the rear by a bored plate 18 held by screws 19 which also serve for attachment of a sheet metal cup 20 to which a protective rubber cap 21 is anchored.

The pump according to this invention is advantageously used in all cases involving high operational pressures and/or frequent piston strokes within its respective cylinder.

It will be obvious from the above description that the improved pump is suitable for use as a master cylinder controlling hydraulic brake mechanisms or friction clutches on motor vehicles.

The use of the pump as a master cylinder for hydraulic brake mechanisms is particularly suited on heavy-duty lorries employing hydraulic servo-brakes, wherein the operating pressures of the master cylinder range from 50 atm. up to 120 atm. and more.

The ring 11 adapted to slide within a cast-iron cylinder can be made for instance of any of the following alloys:

(1) Aluminum bronze, for instance of the following composition:

| | Percent |
|---|---|
| Al | 10 |
| Ni | 5 |
| Fe | 3.5 |
| Mn | 2 |
| Cu | 79.5 |

(2) Brass, for instance of the following composition:

| | Percent |
|---|---|
| Cu | 57 |
| Ni | 2 |
| Al | 0.6 |
| Zn | 40.4 |

What I claim is:

1. In a hydraulic system, the combination of a cylinder, a piston slidable in said cylinder and defining therein a compression chamber connected with utilizing circuits, said cylinder having an opening connected with a fluid reservoir, said piston having a head portion on the piston and facing said compression chamber, a pair of axially spaced annular radial shoulders on said piston head portion, said shoulders facing each other and defining between them a peripheral annular groove in said piston head portion, said groove having a bottom with openings therein communicating with said compression chamber, an annular packing of resilient material in said groove, said packing contacting the inner surface of said cylinder and being spaced from the bottom of said groove, a ring of rectangular cross section with greater radial dimension than axial thickness disposed in said groove between said packing and said radial shoulder remote from said compression chamber, said ring being of material that is substantially underformable at pressures occurring in said compression chamber and slidably engaging the inner surface of said cylinder without circumferential clearance while being spaced from the bottom of said groove, the combined thickness of said packing and ring in an axial direction being less than the spacing between said shoulders whereby said packing and ring are movable axially in said groove to act as a valve controlling communication between said compression chamber and said reservoir through said openings in the bottom of said groove.

2. In a hydraulic system, the combination of a cylinder, a piston slidable in said cylinder and defining therein a compression chamber connected with utilizing circuits, said cylinder having an opening connected with a fluid reservoir, said piston having a head portion on the piston end facing said compression chamber, a pair of axially spaced annular radial shoulders on said piston head portion, said shoulders facing each other and defining between them a peripheral annular groove in said piston head portion said groove having a bottom with openings therein communicating with said compression chamber, said shoulder remote from said compression chamber having an annular step intermediate its inner and outer circumferences, an annular packing of resilient material in said groove, said packing contacting the inner surface of said cylinder and being spaced from the bottom of said groove, a ring of rectangular cross section disposed in said groove between said packing and said radial shoulder remote from said compression chamber and outside said step, said ring being of material that is substantially underformable at pressures occurring in said compression chamber and having a thickness substantially equal to the axial dimension of said step, said ring slidably engaging the inner surface of said cylinder without circumferential clearance while being spaced radially from said step, the combined thickness of said packing and ring in an axial direction being less than the spacing between said shoulders whereby said packing and ring are movable axially in said groove to act as a valve controlling communication between said compression chamber and said reservoir through said openings in the bottom of said groove.

References Cited in the file of this patent

UNITED STATES PATENTS

| 2,254,937 | Dick | Sept. 2, 1941 |
| 2,500,502 | Vogel | Mar. 14, 1950 |
| 2,805,551 | Baldwin | Sept. 10, 1957 |

FOREIGN PATENTS

German application, 1,037,882, printed Aug. 28, 1958 (Kl.63c 54/06).